United States Patent [19]

Fujino et al.

[11] Patent Number: 4,928,215

[45] Date of Patent: May 22, 1990

[54] VEHICLE LAMP DEVICE

[75] Inventors: Yuuji Fujino; Yasuhiro Nakamura, both of Shizuoka, Japan

[73] Assignee: Koito Manufacturing Co., Ltd., Tokyo, Japan

[21] Appl. No.: 324,864

[22] Filed: Mar. 17, 1989

[30] Foreign Application Priority Data

| Mar. 17, 1988 | [JP] | Japan | 63-36131[U] |
| Jul. 15, 1988 | [JP] | Japan | 63-176514 |
| Oct. 8, 1988 | [JP] | Japan | 63-252918 |

[51] Int. Cl.$^5$ ............................................. B60Q 1/02
[52] U.S. Cl. .............................. 362/61; 362/66; 362/420; 362/428
[58] Field of Search ............ 362/61, 80, 66, 67, 362/68, 69, 70, 285, 418, 419, 420, 421, 422, 423, 424, 425, 426, 427, 428

[56] References Cited

U.S. PATENT DOCUMENTS

| 4,249,232 | 2/1981 | Dick | 362/61 |
| 4,271,456 | 6/1981 | Dick | 362/428 |
| 4,569,007 | 2/1986 | Dick | 362/61 |
| 4,675,793 | 6/1987 | Capellari et al. | 362/66 |
| 4,679,125 | 7/1987 | Dick | 362/66 |
| 4,710,857 | 12/1987 | Haug et al. | 362/61 |
| 4,722,033 | 1/1988 | Van Duyn et al. | 362/427 |
| 4,742,435 | 5/1988 | Van Duyn et al. | 362/66 |
| 4,757,428 | 7/1988 | Ryder et al. | 362/420 |
| 4,761,717 | 8/1988 | McMahon et al. | 362/420 |
| 4,843,523 | 6/1989 | Nakamura | 362/422 |
| 4,843,531 | 6/1989 | Mochiyuki et al. | 362/421 |

FOREIGN PATENT DOCUMENTS

| 0291744 | 11/1988 | Japan | 362/66 |
| 1289841 | 3/1970 | United Kingdom |  |
| 2093174 | 8/1982 | United Kingdom | 362/61 |

*Primary Examiner*—Ira S. Lazarus
*Assistant Examiner*—Sue Hagarman
*Attorney, Agent, or Firm*—Sughrue, Mion, Zinn, Macpeak & Seas

[57] ABSTRACT

A vehicle lamp device in which the gap provided beside the headlamps is made inconspicuous, and rainwater or dust are prevented from entering the gap. The inventive vehicle lamp device in one embodiment includes a unit movable rectangular headlamp and a rectangular vehicle lamp arranged with a gap therebetween, and, of the confronting side walls of the front lens of at least one of the lamps, at least one has a front edge protruding outwardly so that the gap between the front lenses of the lamps is narrower at the front edge of the side wall.

5 Claims, 14 Drawing Sheets

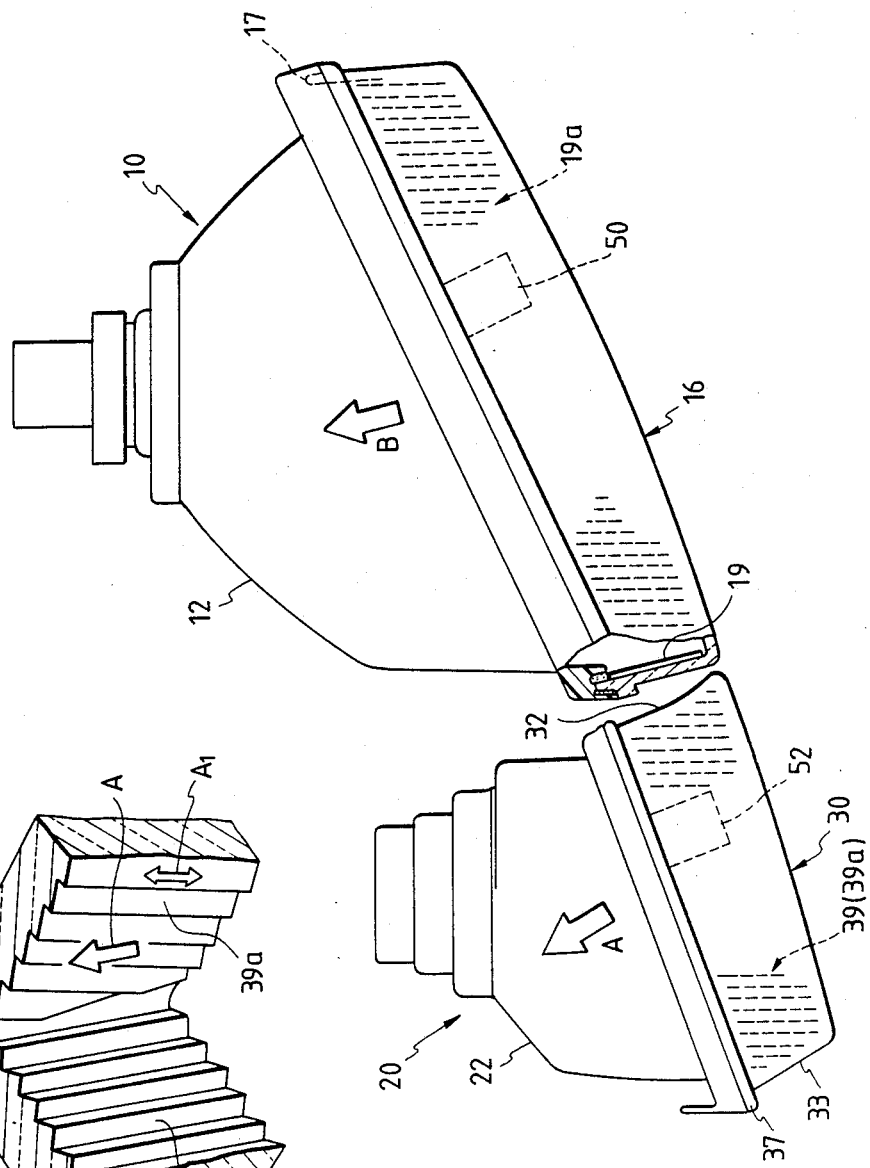
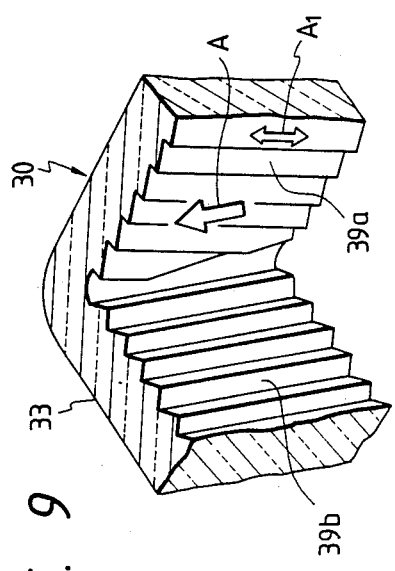
FIG. 10
FIG. 9

VEHICLE LAMP DEVICE

BACKGROUND OF THE INVENTION

The present invention relates to a vehicle lamp device having a rectangular headlamp.

Recently, rectangular headlamps, which are rectangular in shape as viewed from the front, have been extensively employed for automotive vehicles. In practice, a rectangular headlamp is often used in combination with another rectangular lamp such as a rectangular fog lamp or rectangular clearance lamp. That is, there has been a tendency to employ a so-called "compound headlamp".

A unit movable rectangular headlamp is available in which a reflector is integral with the inner surface of its lamp body, so that the adjustment in the angle of irradiation of the headlamp (hereinafter referred to as "aiming adjustment" when applicable) is achieved by tilting the lamp body with respect to the lamp housing, which is mounted on the vehicle body. In the case where the unit movable rectangular headlamp is positioned adjacent, for instance, a rectangular fog lamp, the gap between the two lamps is unavoidably large because the vibration of the headlamp caused by the aiming adjustment, interference of aiming member mounting parts, and the presence of fixing metal parts for the lenses and the lamp bodies with the lamps adjacent thereto must be taken into account. Therefore, the compound headlamp has a poor external appearance when viewed from the front, and the two lamps are generally not harmonious with each other.

Furthermore, the conventional compound headlamp is disadvantageous in that rainwater or dust is liable to enter the gap between the lamps, making them dirty, or enter through the gaps into the space behind the lamps, thus entering the latter through air holes formed in the rear walls of the lamp bodies.

In the case where the unit movable rectangular headlamp is positioned adjacent to the bumper, a gap is formed between the headlamp and the bumper, thus involving the same problem.

Yet further, the invention relates to a vehicle lamp device having two lamps, namely, a tiltable headlamp and a vehicle lamp positioned beside the headlamp in such a manner that the front lenses of the two lamps are adjacent to each other. The invention provides a vehicle lamp device in which, even when the distance between the two lamps is made minimum, the front lenses of the lamps will not strike against each other, and accordingly preventing damage or noise.

As mentioned above, plural vehicle lamps such as headlamps and various marker or signal indicator lamps are installed on a vehicle such as an automobile. These vehicle lamps are sometimes installed adjacent to one another. For instance, a main headlamp and an auxiliary headlamp such as a fog lamp, a pair of headlamps in a so-called "four-lamp type headlamp unit", or a headlamp and a vehicle width lamp are often installed close to each other.

An example of a vehicle lamp device of this type is as shown in FIG. 1.

In FIG. 1, reference character a designates a main headlamp. The main headlamp includes a lamp body c having a reflecting mirror surface b which is of a paraboloid of revolution in shape, a front lens d covering the front opening of the lamp body c, and a light bulb e secured to the top of the lamp body c. The main headlamp a is tiltably supported on a lamp housing f.

Further in FIG. 1, reference character g designates an auxiliary headlamp such as a fog lamp. The auxiliary headlamp g includes a lamp body g, a lens i covering the front opening of the lamp body h, a mirror j tiltably arranged in the lamp space defined by the lamp body h and the lens i, and a light bulb k supported on the mirror j. The lamp body h is fixedly secured to the lamp housing f in such a manner that the front surface of the lens i is substantially flush with that of the lens d of the main headlamp a, and a small gap is provided between the lenses d and i of the two lamps a and g.

In general, an automobile headlamp requires an aiming adjustment. In other words, the headlamp should be so designed that after it is installed on the vehicle body, an initial adjustment of its irradiation direction can be performed.

The main headlamp a shown in FIG. 1 is of the unit movable type. The main headlamp is tiltably supported on the lamp housing f by a fulcrum mechanism (not shown) and a horizontal aiming adjustment mechanism (not shown). The fulcrum mechanism has a fulcrum at the point A which is located close to one end portion of the rear surface of the lamp body c. The horizontal aiming adjustment mechanism has an adjustment point sideward of the point A. The vertical aiming adjustment mechanism has an adjustment point downward of the point A. The horizontal aiming adjustment mechanism swings the lamp as indicated by the two-dot chain line (one-dot chain line) so that the direction of irradiation is adjusted in a horizontal plane. The vertical aiming adjustment mechanism swings the lamp vertically so that the direction of irradiation is adjusted in a vertical plane. On the other hand, the auxiliary headlamp g is of the movable-mirror type. In the auxiliary headlamp g, the mirror j is swingable vertically.

In the above-described conventional vehicle lamp device, depending on the initial aiming adjustment of the headlamp a, sometimes the front lenses d and i of the two lamps a and g are made extremely close to each other. If, under this condition, the automobile travels, then the front lenses d and i of the two lamps may strike against each other due to vibration, as a result of which they may be damaged, or a jarring noise may be produced, or at worst the lenses may be cracked or broken.

The above-described difficulty may be eliminated by increasing the gap between the two lamps. However, doing so involves another problem in that the resulting large gap gives a poor sense of design, or the space for installation of the lamps is increased.

SUMMARY OF THE INVENTION

In view of the foregoing, an object of the present invention is to provide a vehicle lamp device in which the gap provided beside the headlamps is made inconspicuous, and rainwater or dust are prevented from entering the gap.

The foregoing and other objects of the invention have been achieved by the provision of a vehicle lamp device in which a unit movable rectangular headlamp and a rectangular vehicle lamp are arranged with a gap therebetween, and according to the invention, of the confronting side walls of the front lens of at least one of the lamps, at least one has a front edge protruding outwardly so that the gap between the front lenses of the lamps is narrower at the front edge of the side wall.

In the case where a unit movable rectangular headlamp is installed adjacent a bumper with a gap therebetween, the lower side wall of the front lens of the lamp, which wall confronts the upper edge of the bumper, has a front edge protruding outward so as to decrease the gap therebetween at the front edge.

With this construction, the gap between the two lamps disposed adjacent to each other is not noticeable because it is narrower at the front edges of the confronting side walls of the front lenses of the lamps. This also prevents the entrance of rainwater or dust into the gap. The sectional area of the air flow path formed in the gap between the side walls of the front lenses is made narrow at the inlet of the air flow path by the protruding front edge of the side wall of at least one of the front lenses, and is abruptly increased behind the inlet. Therefore, the stream of air flowing into the gaps loses its energy at the position where the air flow path is abruptly increased in sectional area. That is, the abrupt increase in sectional area of the air flow path acts as a resistance to the stream of air in the gap, thus decreasing the quantity of air flowing through the gap into the space behind the lamp. Accordingly, the quantity of rainwater or dust flowing together with the air into the space behind the lamp is also decreased.

According to another aspect of the invention, the outer surface of one side wall of the front lens of the vehicle lamp which surface is adjacent to the headlamp is inwardly curved.

Further in accordance with the invention, there is provided a vehicle lamp device having a headlamp and a vehicle lamp which are arranged with a small gap between the front lenses thereof, and wherein one of the lamps has a striking part on its surface which confronts the other lamp so that, before the front lenses are caused to collide with each other by the tilting of the head lamp, the striking part contacts a part of the other lamp which is other than the front lens of the latter. Therefore, with the vehicle lamp device of the invention, even if the gap between the front lenses of the two lamps is made minimum, the front lenses will never collide with each other, and accordingly are prevented from damage. In addition, for the same reason, the vehicle lamp device is free from the difficulty that the front lenses are caused to collide with each other by vibration, thus producing jarring noise.

BRIEF DESCRIPTION OF THE DRAWINGS

FIG. 9 is a perspective view showing side steps formed on the fog lamp's front lens;

FIG. 10 is a plan view showing a modification of the front lenses;

DESCRIPTION OF THE PREFERRED EMBODIMENTS

Preferred embodiments of the invention will be described with reference to the accompanying drawings.

Figure 1:
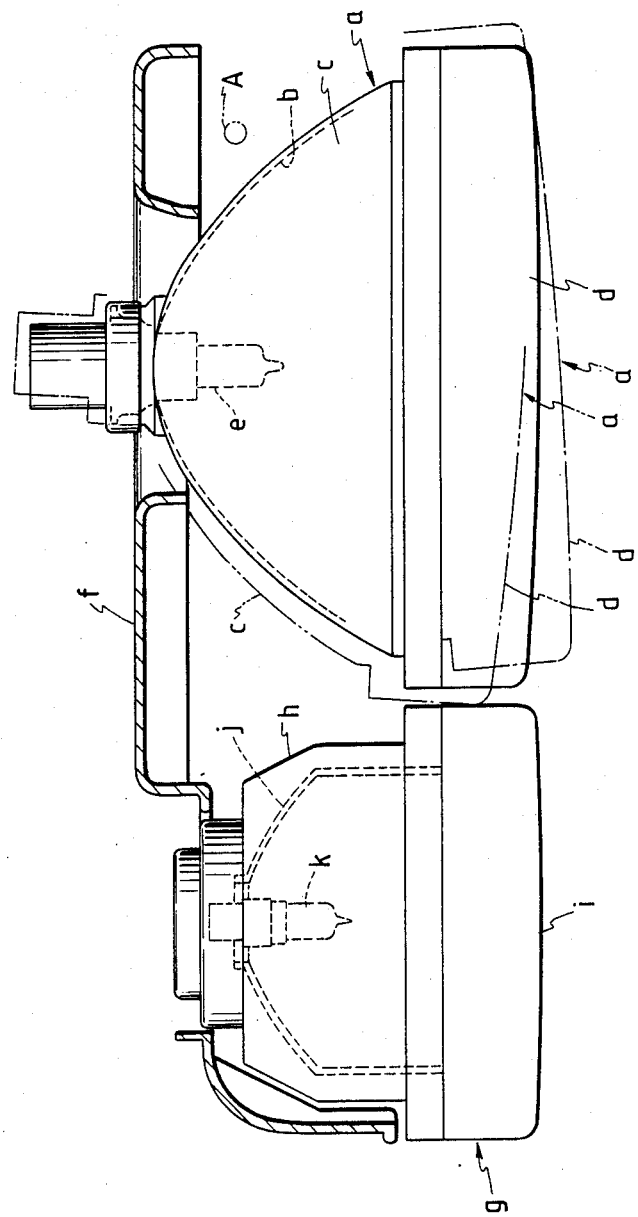
FIG. 1 is a plan view showing an example of a conventional vehicle lamp device.
Figure 2:
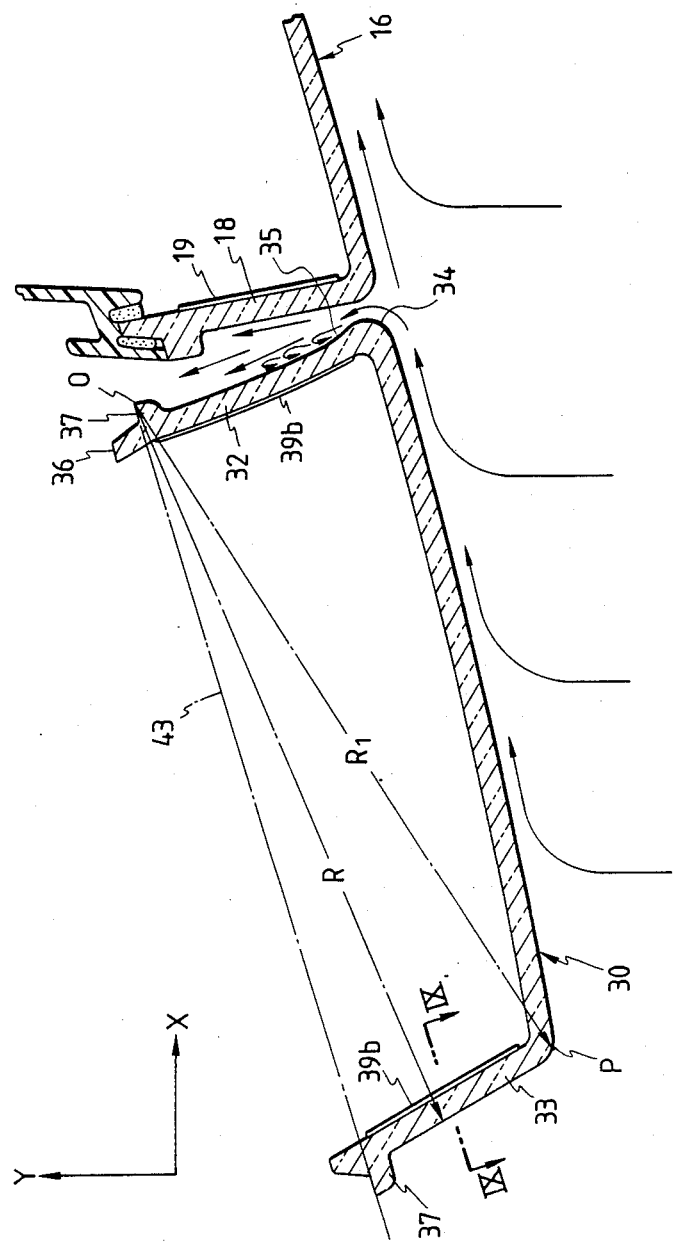
FIG. 2 is a sectional view showing an air flow path provided in the gap between the front lens of a headlamp.
Figure 3:
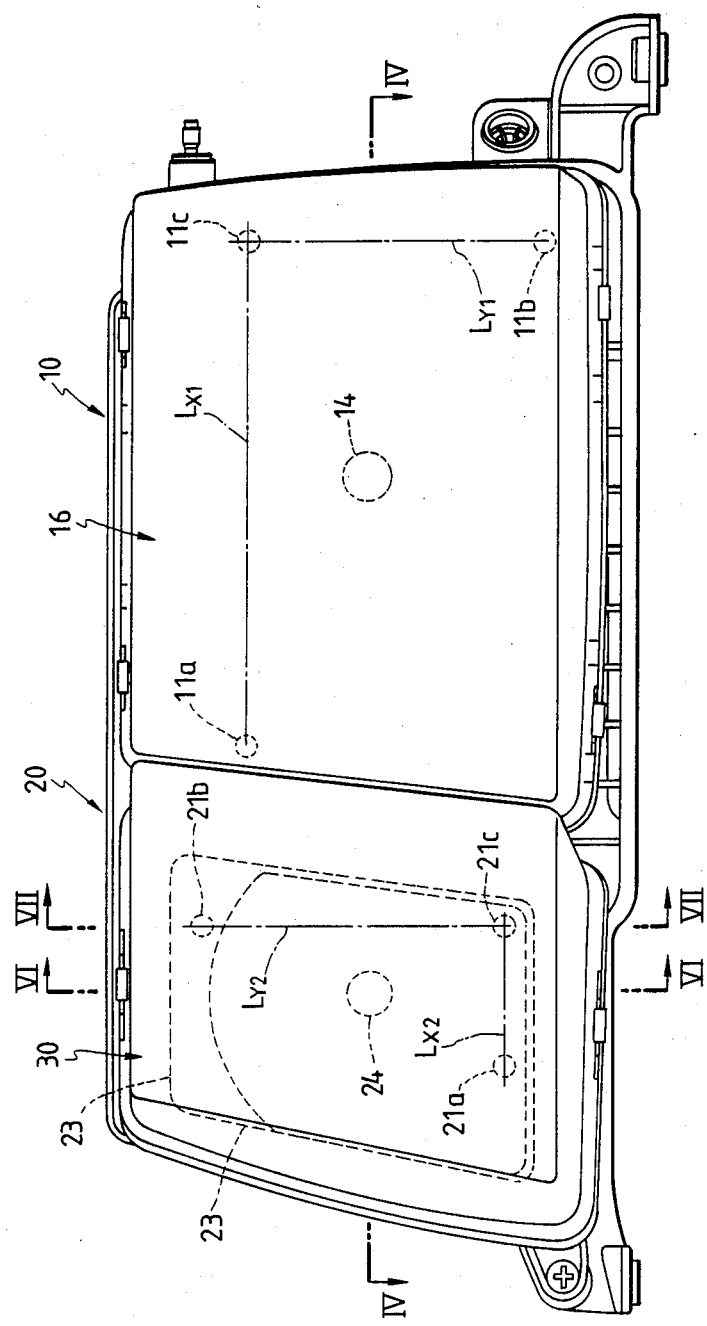
FIG. 3 is a front view of a compound headlamp comprising a headlamp and a fog lamp.
Figure 4:
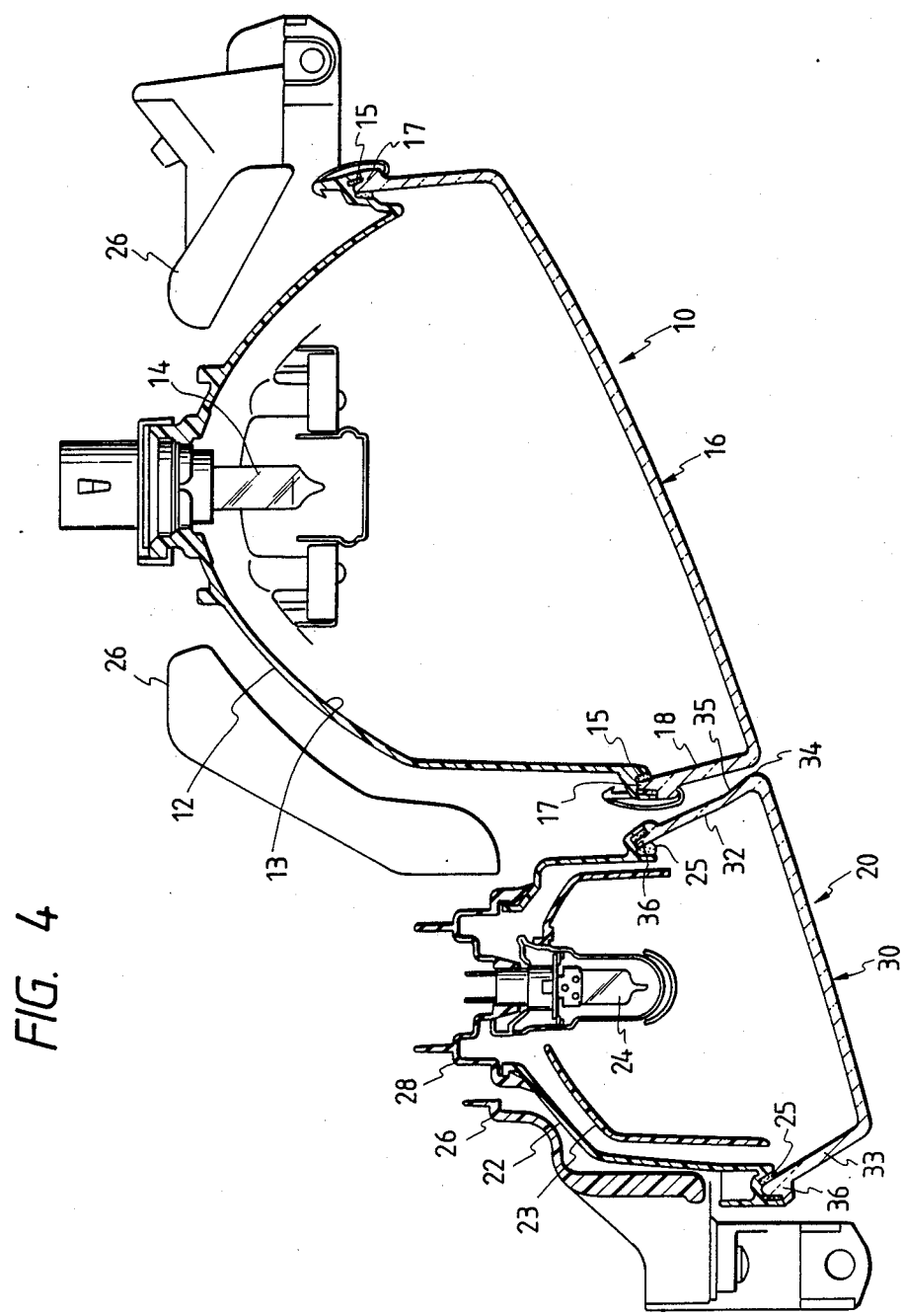
FIG. 4 is a sectional view taken along a line IV—IV in FIG. 3.
Figure 5:
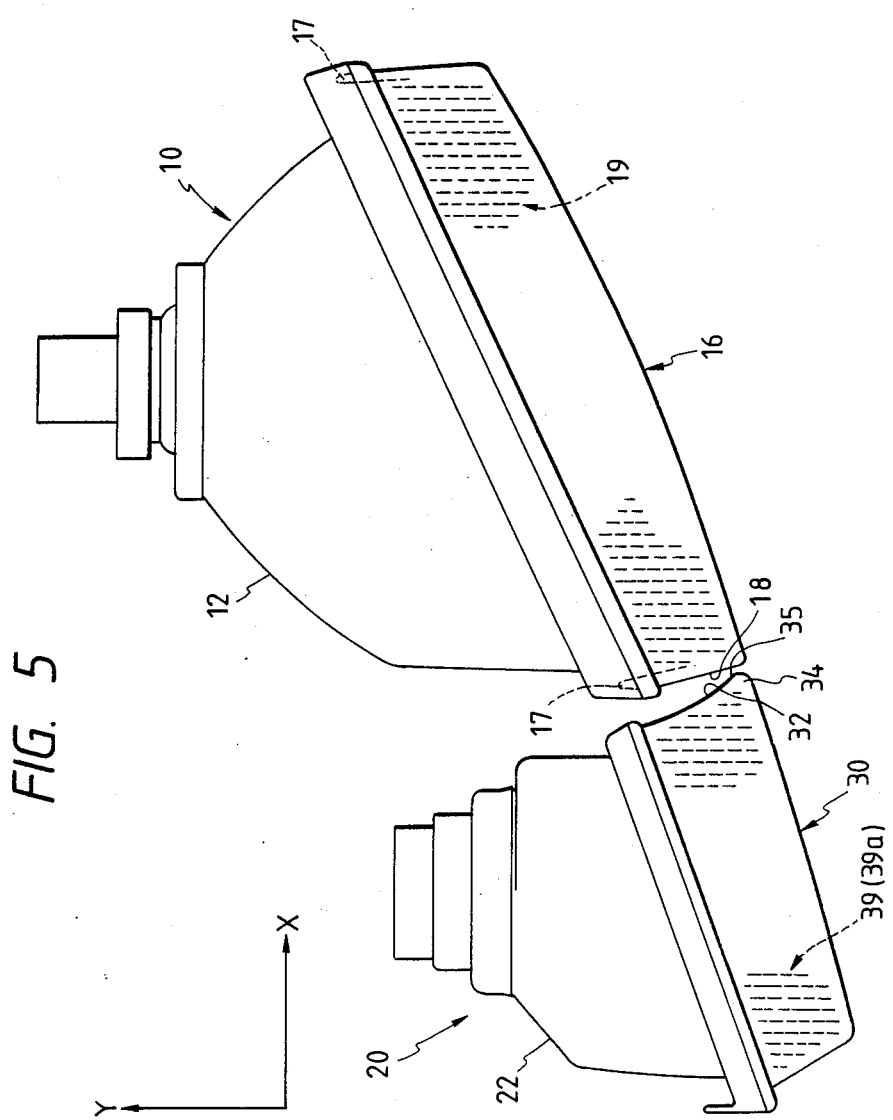
FIG. 5 is a plan view of the compound headlamp shown in FIG. 3.
Figure 6:
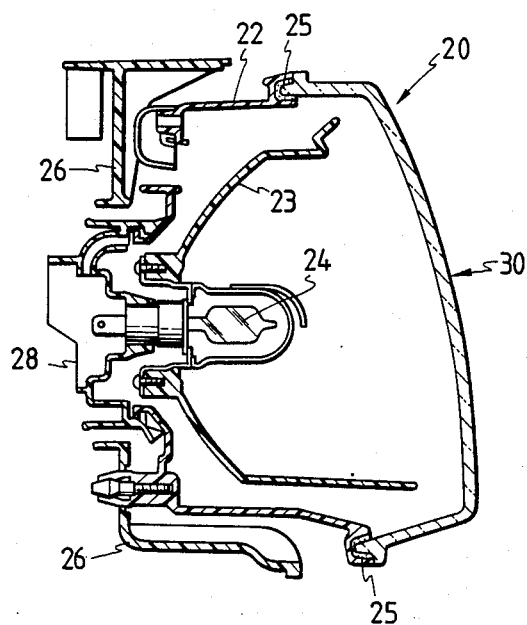
FIG. 6 is a sectional view taken along a line VI—VI in FIG. 3.
Figure 7:
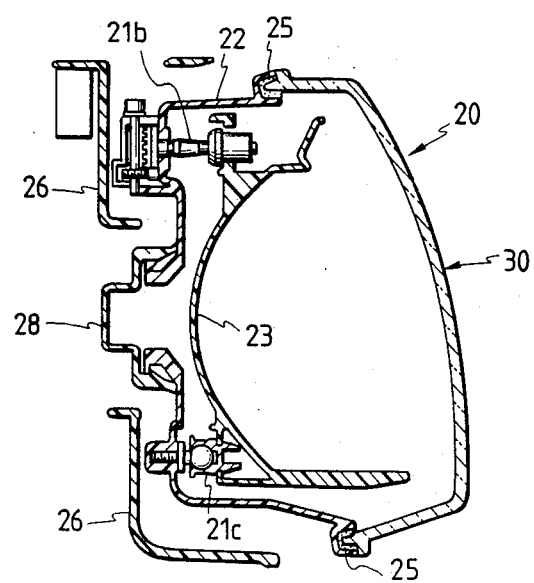
FIG. 7 is a sectional view taken along a line VII—VII in FIG. 3.

FIGS. 2 through 9 show a compound headlamp composed of a headlamp and a fog lamp which are arranged adjacent to each other in a lamp housing. FIG. 2 is an enlarged sectional view showing an air flow path between front lenses disposed adjacent each other. FIGS. 3, 4 and 5 are a front view, a cross-sectional view, and a plan view of the compound headlamp, respectively. FIGS. 6 and 7 are sectional views taken along lines VI—VI and VII—VII, respectively, in FIG. 3; FIGS. 8A-8C are explanatory diagrams for a description of a procedure of removing a fog lamp's front lens from its metal mold. FIG. 9 is an enlarged perspective view showing a part of the fog lamp's front lens as taken along a line IX—IX in FIG. 2.

In these figures, reference numeral 1 designates a unit movable rectangular headlamp to be installed on the left side of an automobile, and 12, a box-shaped lamp body. The inner surface of the lamp body 12 is a light reflecting surface 13 in the form of a paraboloid to reflect forwardly the output light of a light bulb 14 which is fixed at the top of the lamp body 12. A sealing groove 15 is formed in the peripheral edge of the front opening of the lamp body 12. The edge of a box-shaped front lens 16 is inserted into the sealing groove 15 thus formed to form the headlamp 10. More specifically, the front lens 26 has a sealing leg 17 which is engaged through a sealing agent with the sealing groove 15.

The headlamp 10 is supported on a lamp housing 26 at three points, namely, with adjusting screws $11a$ and $11b$ and a ball-joint type bearing $11c$. The headlamp 10 is swung about the horizontal axis $L_{x1}$ and the vertical axis $L_{y1}$ by rotation of the adjusting screws $11a$ and $11b$, respectively, so that it is suitably aimed.

Further in these figures, reference numeral 20 designates the rectangular fog lamp disposed adjacent the headlamp with a predetermined gap therebetween. The headlamp 10 is swung about the vertical axis $L_{y1}$ for its horizontal aiming adjustment. Therefore, the gap between the fog lamp 20 and the headlamp 10 is made large enough to allow the swing of the headlamp 10. The fog lamp has a box-shaped lamp body 22, inside of which a reflector 23 is provided, and a light bulb 24 is fixed to the reflector at the center. The reflector 23 is supported on the lamp body 22 at three points, namely, with adjusting screws $21a$ and $21b$ and a ball-joint type bearing $21c$. A sealing groove 25 is formed in the peripheral edge of the front opening of the lamp body 22. The edge of a front lens 30 is inserted into the sealing groove 25 thus formed to form the fog lamp 20. More specifically, the front lens 30 has a sealing leg 36, which is engaged through a sealing agent with the sealing groove 25. In the fog lamp, the reflector 23 is swung about the horizontal axis $L_{x2}$ and the vertical axis $L_{y2}$ by rotating the adjusting screws so that it is suitably aimed.

In FIGS. 4, 6 and 7, reference numeral 26 designates the lamp housing which accommodates the headlamp 10 and the fog lamp 20 as one unit and which is secured to the vehicle body with screws, and 28, a rubber socket cover closing the bulb inserting hole formed in the fog lamp's lamp body 22.

The fog lamp's front lens 30 is in the form of a box whose vertical length is substantially equal to that of the headlamp's front lens 10. As shown in FIG. 5, side steps 19 and 39 having step grooves extending in the longitudinal direction (Y-direction) of the vehicle are formed on the inner surfaces of the upper, lower, right and left side walls of the front lenses 16 and 30 of the two lamps. The side steps are provided to scatter light passing through the side walls of the lamps thereby to make the leakage of light therethrough unnoticeable. The step grooves of the side steps 19 and 39 are extended in the same direction, thus showing the same pattern on the side walls of the lenses. The front edge 34 of the right wall 32 (beside the headlamp) of the front lens 30 protrudes to the right (or towards the left side wall 18 of the headlamp's front lens 16), thus providing a small gap between the front lenses 16 and 30.

As is apparent from the above description, the front lenses 16 and 30 of the two lamps 10 and 20 are substantially the same in design, and the gap therebetween, being considerably small, is not noticeable. Thus, the headlamp and the fog lamp are made harmonious with each other. Since the front edge 34 of the front lens side wall 32 protrudes as described above, the gap between the lens side wall 18 of the headlamp and the lens side wall 32 of the fog lamp is much smaller than that in the conventional vehicle lamp device of this type, thus significantly retarding the entrance of rainwater or dust.

The side wall 32 of the fog lamp's front lens 30 includes an inwardly curved portion 35 near the front edge 34. The side region of the side wall which extends from the inwardly curved portion 35 to the sealing leg 36 of the front lens extends in a direction substantially perpendicular to a flange 37 forming plane (metal mold separating plane) 43. The lens side wall 32 and the lens side wall 18 confronting the latter 32 are inclined in such a manner that their front edges protrude outward.

As shown in FIG. 2, the headlamp's front lens 16 and the fog lamp's front lens 30 are arranged inclined with respect to the X-direction perpendicular to the longitudinal direction (Y-direction) of the vehicle, and an air flow path is formed between the side walls 18 and 32 of the two lenses 16 and 30 to allow air to flow into the gap between the two side walls from in front of the vehicle. The sectional area of the air flow path is made smaller at the inlet by the protruding front edge 34, is abruptly increased at the inwardly curved portion 35 near the inlet, and then gradually made larger towards the outlet of the air flow path. Therefore, eddies are formed at the inwardly curved portion 35 as shown in FIG. 2, as a result of which the air flow has a great loss of energy is this region. Since the sectional area of the air flow path is smaller towards the outlet, the loss of energy is greater towards the outlet. Therefore, the air flow path is larger in air flow resistance than in the case where, as in the conventional air flow path formed between the lens side walls, the sectional area is not abruptly increased and is not larger toward the outlet. Accordingly, the quantity of air flowing through the gap is decreased as much. That is, the quantity of air flowing in the space behind the lamps is smaller than in the case of the conventional vehicle lamp device of this type, and accordingly the quantity of rainwater or dust flowing in with the stream of air is reduced.

Figure 8A:
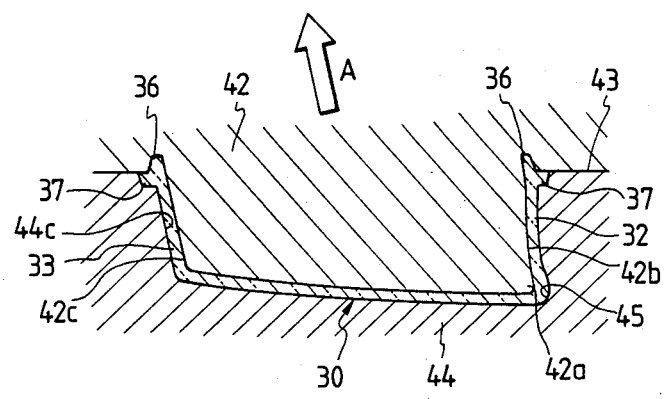
FIGS. 8A-8C are explanatory diagrams for a description of a procedure of extracting a front lens of a fog lamp from a metal mold.

FIG. 8a is a sectional view showing essential components of a metal mold for forming the front lens 30. In FIG. 8A, reference numerals 42 and 44 respectively designate upper and lower molds, and 43, the abutting surfaces of the upper and lower molds 42 and 44, that is, a metal mold separating plane. In FIG. 8A, the arrow A indicates the direction of sliding of the upper mold 42.

In FIG. 8A, the molding surface region 45 of the lower mold, which is to form the outer surface of the protruding front edge 34 of the front lens 30, is undercut. The thickness of the protruding front edge 34 is substantially equal to that of the other portions of the front lens so that the front lens is not thermally strained. Therefore, the molding surface region 42a of the upper mold 42, which is to form the inner surface of the protruding front edge 34, is shaped similar to the molding surface region 45 of the lower mold 44; that is, it protrudes outwardly. The distance between the side walls 32 and 33 of the front lens is larger toward the sealing leg 36 so that the upper mold 43 can smoothly slide in the direction of the arrow A.

More specifically, the molding surface regions 42c and 44c for forming the side wall 33 of the front lens extend substantially in the same direction as the direction A of the sliding movement of the upper mold 42, and the molding surface regions 42b and 44b extend in such a manner as to form an angle with the direction A of sliding of the upper mold 42 so that the protruding molding surface region 42a of the upper mold 42 cannot obstruct the removal of the upper mold from the lower mold.

As described above, the molding surface region 45 of the lower mold is undercut. Therefore, the side wall 33 (the molding surface region 44c of the lower mold) is shaped in a manner to be described. By dint of this fact, and with the use of a mold separating method also provided in accordance with the invention, the molded front lens can be smoothly extracted from the mold.

Figure 8B:
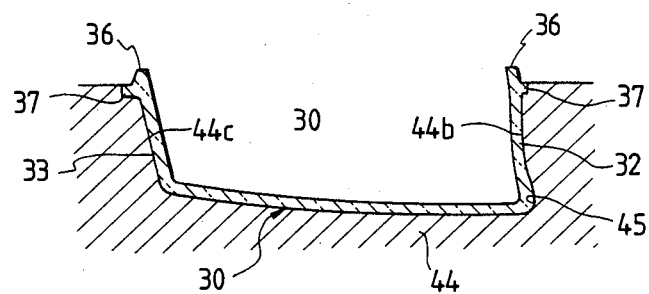
Figure 8C:
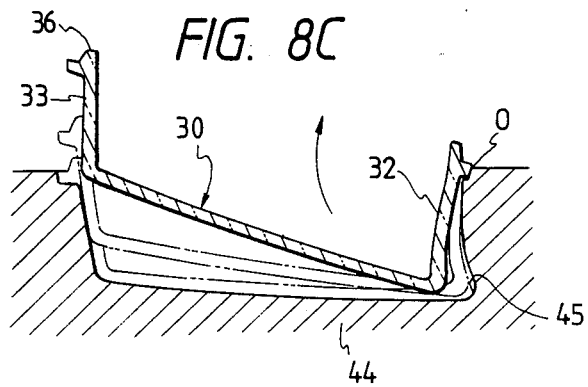

That is, the side wall 33 of the front lens 3, which is opposite to the side wall 32, is designed so that, in the cross section as shown in FIG. 2, the distance R between the point O on the outer periphery of the flange 37 formed on the side wall 32 and the outer surface of the slide wall 33 is longer than the distance $R_1$ between the point O and the point on the front edge of the side wall 33. After the upper mold 42 has been removed as shown in FIG. 8B, the molding, i.e., the front lens 30 can be removed by turning it about the point O, as shown in FIG. 8C. In practice, with the sealing leg 36 of the side wall 33 clamped with a predetermined clamping jig, the front lens is extracted by turning it about the point O. Therefore, it is unnecessary that the lower mold be of a split type, and accordingly the metal mold is simple in construction. In addition, the difficulty that the separating line of the slit mold is imprinted on the front lens 30 does not arise.

Of the side steps 39 formed on the side walls of the front lens, those which are formed on the side walls 32 and 33, as indicated at 39b in FIG. 9, are each equilaterally triangular in section, similar to the side steps 19 formed on the side walls of the headlamp's front lens 16. On the other hand, the side steps formed on the upper and lower side walls of the front lens 30, as indicated at 39a in FIG. 9, are in the form of sawteeth in section which are inclined in the direction of sliding (the direction of the arrow A) of the upper mold. Therefore, by sliding the upper mold 42 in the direction of the arrow A (FIG. 9), the mold can be removed without damaging the side steps 39a. Accordingly, although, as shown in FIG. 9, the direction of extension (the direction of the arrow $A_1$) of the step grooves is different from the direction of sliding (the direction of the arrow A) of the mold, it is unnecessary to use a slit mold to form the front lens.

FIG. 10 is a plan view of a compound headlamp having a headlamp and a fog lamp arranged adjacent to each other, showing a modification of the lamp front lenses.

As shown in FIG. 10, the upper side walls of the front lenses 16 and 30 include respective transparent regions 50 and 52 where no side steps are formed. The transparent regions are utilized when it is required to look into the lamp, for instance, for detecting the angle of inclination in a horizontal plane of the reflector.

The side steps 19a formed on the upper and lower side walls of the headlamp's front lens 16 are similar in configuration to the inclined sawtooth shaped side steps 39a formed on the upper and lower side walls of the fog lamp's front lens 30. Therefore, the transparent surface regions 50 and 52 can be formed in the side walls at any position with a desired size.

In FIG. 10, reference character A designates the direction of sliding of the upper mold for forming the fog lamp's front lens 30, and B, the direction of sliding of the upper molding for molding the headlamp's front lens 16.

In the above-described embodiment, the fog lamp's front lens 30 is provided with the protruding front edge 34 to decrease the gap between the front lenses 16 and 30. However, instead, the headlamp's front lens 16 may be modified so as to have a protruding front edge, and the two front lenses 16 and 30 may be modified so as to have protruding front edges.

While the invention has been described with reference to a compound headlamp having a headlamp and a fog lamp which are arranged adjacent to each other, it should be noted that the invention is not limited thereto or thereby; that is, the technical concept of the invention is applicable to other compound headlamps having a headlamp and a vehicle lamp such as a clearance lamp which are juxtaposed adjacent to each other.

Further, the invention is not limited just to a vehicle lamp device in which a headlamp and a vehicle lamp are arranged adjacent to each other. That is, the technical concept of the invention is applicable also to the case in which a unit movable rectangular headlamp is arranged adjacent to the bumper. In this case, the front edge of the lower side wall of the headlamp's front lens should protrude towards the bumper to decrease the gap between the headlamp and the bumper.

As is apparent from the above description, with the vehicle lamp device according to the invention, the gap formed beside the headlamp is not noticeable, and the two lamps are harmonious in appearance with each other, thus improving the external appearance around the headlamp as viewed from the front of the vehicle. In addition, the inlet of the gap formed beside the headlamp is small, and therefore the entrance of rainwater or dust into the gap between the lamps and the gaps between the lamp and the bumper and the space behind the lamps can be greatly prevented.

Since the quantity of rainwater or dust entering the space behind the lamps is decreased as described above, the quantity of rain or dust entering the lamps through the air holes formed in the rear walls of the lamp bodies is also decreased. Therefore, the inner surfaces of the lamps are scarcely blurred or made dirty by dust. Thus, the vehicle lamp device of the invention is stable in operation for long periods of time.

Another example of a vehicle lamp device constructed according to the invention will be described in detail with reference to FIGS. 11 through 15. The example shown in these figures is an automobile headlamp device having two headlamps, to which the technical concept of the invention is applied.

Reference numeral 101 designates the aforementioned automobile headlamp device. The device 101 includes a main headlamp 102 of unit movable type, and an auxiliary headlamp 103 of movable-mirror type such as a fog lamp.

Further, reference numeral 104 designates a lamp housing made of synthetic resin. The lamp housing 104 is fixedly secured to a vehicle body 105 in such a manner that it is positioned behind a headlamp arranging opening 105a of the vehicle body 105.

The main headlamp 102 is tiltably supported through one fulcrum and two timing adjustment points on the lamp housing 104. The auxiliary headlamp is fixedly secured to the lamp housing 104. With continued reference to FIGS. 11 through 14, reference numeral 106 designates the headlamp unit of the main headlamp 102. The headlamp unit 106 includes a lamp body 107 having a recess which is opened substantially forwardly, a lens 108 covering the front opening of the lamp body 107, and a light bulb 109 supported on the lamp body 107.

The configuration of the main portion of the lamp body 107 is such that the upper and lower end portions of a paraboloid of revolution are removed. The inner surface of the lamp body which is faced forwardly is a reflecting surface. The lamp body 107 includes a lens mounting part 107a which extends substantially sideward from the front edge of the lamp body 107. The light bulb 109 is fitted in a light bulb mounting hole 110a formed in the top of the reflecting surface 110 in such a manner that its light emitting part is substantially at the focal point of the reflecting surface 110.

The lens 108 includes a substantially rectangular front portion 108a which extends horizontally as viewed from the front, a peripheral wall portion 108b which extends rearward from the edge of the front portion 108a. The lens 108 further includes a stripe 108c extending from the rear end face of the peripheral portion 108b The stripe 108c is fitted in a lens mounting groove 107b which is formed in the lens mounting part 107a of the lamp body 107. Under this condition, the lens 108 is fixedly secured to the lamp body using, for instance, an adhesive.

Figure 11:
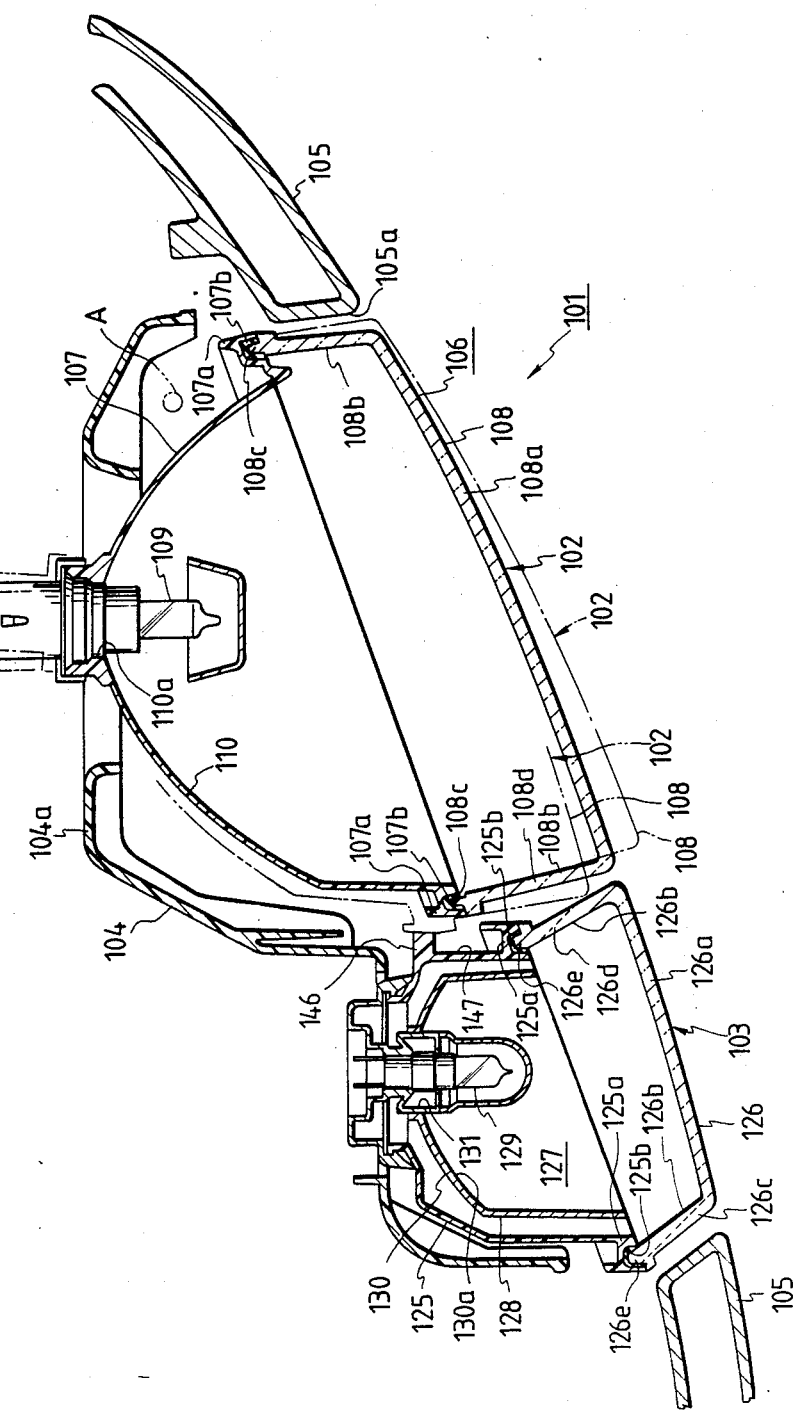
FIG. 11 is a cross-sectional view of another automobile headlamp device of the invention.
Figure 12:
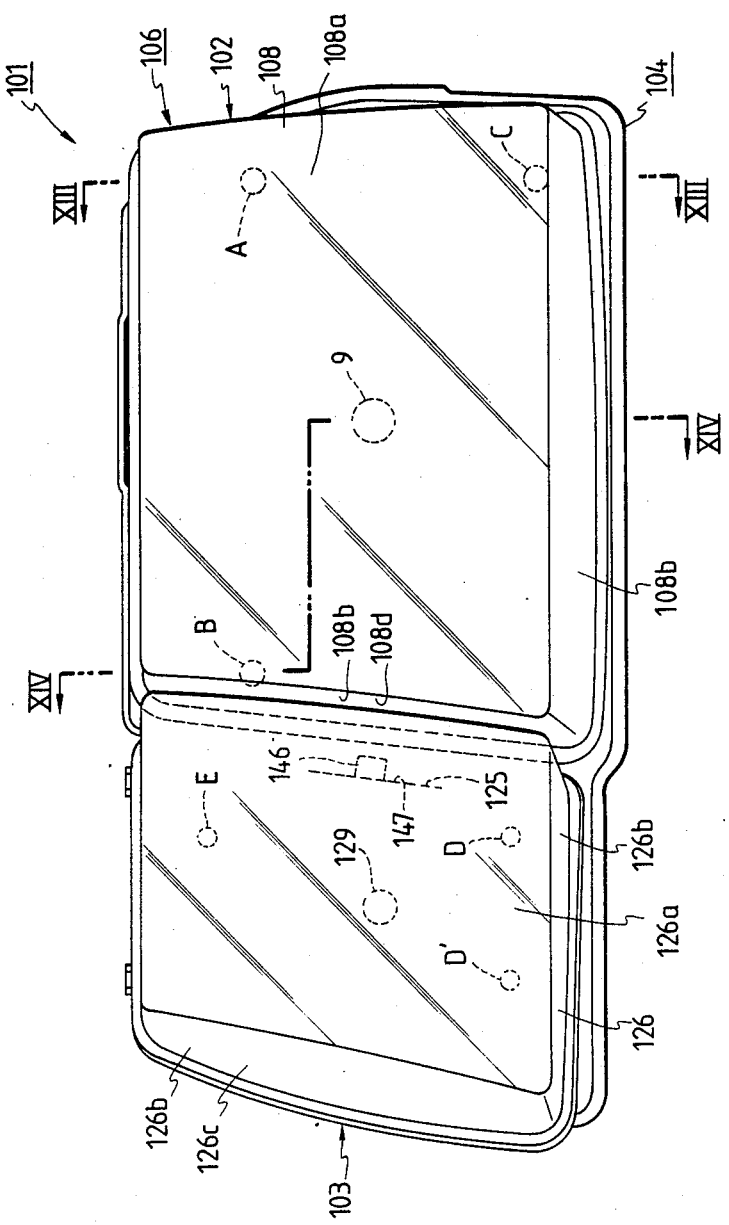
FIG. 12 is a front view of the headlamp device of FIG. 11.
Figure 13:
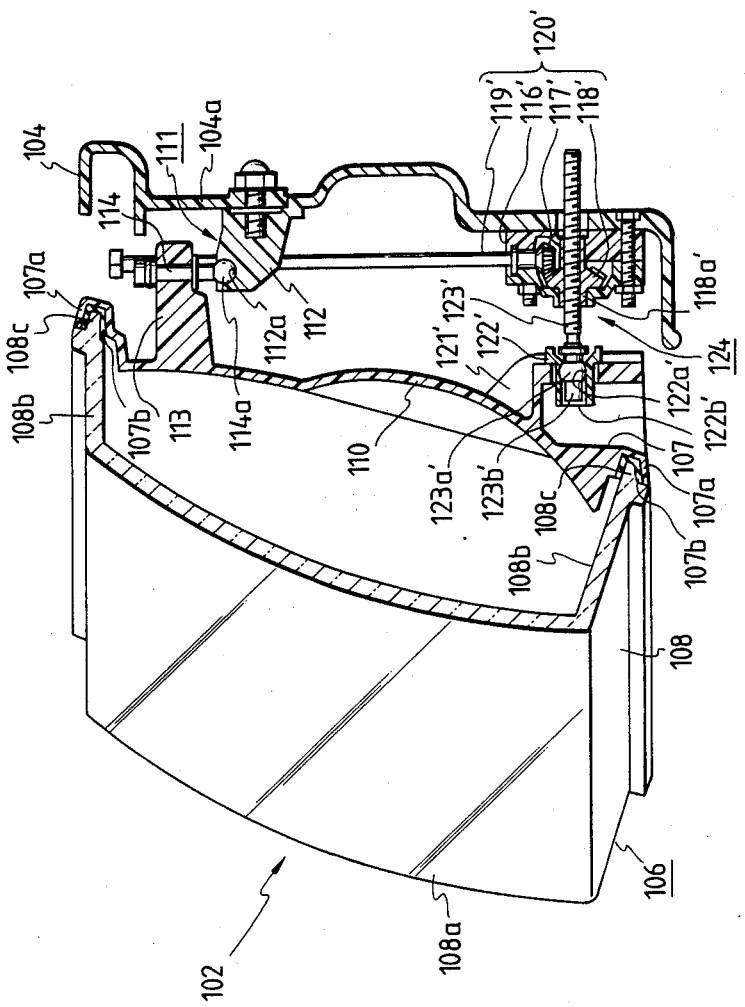
FIG. 13 is a sectional view taken along a line XIII—XIII in FIG. 12.
Figure 14:
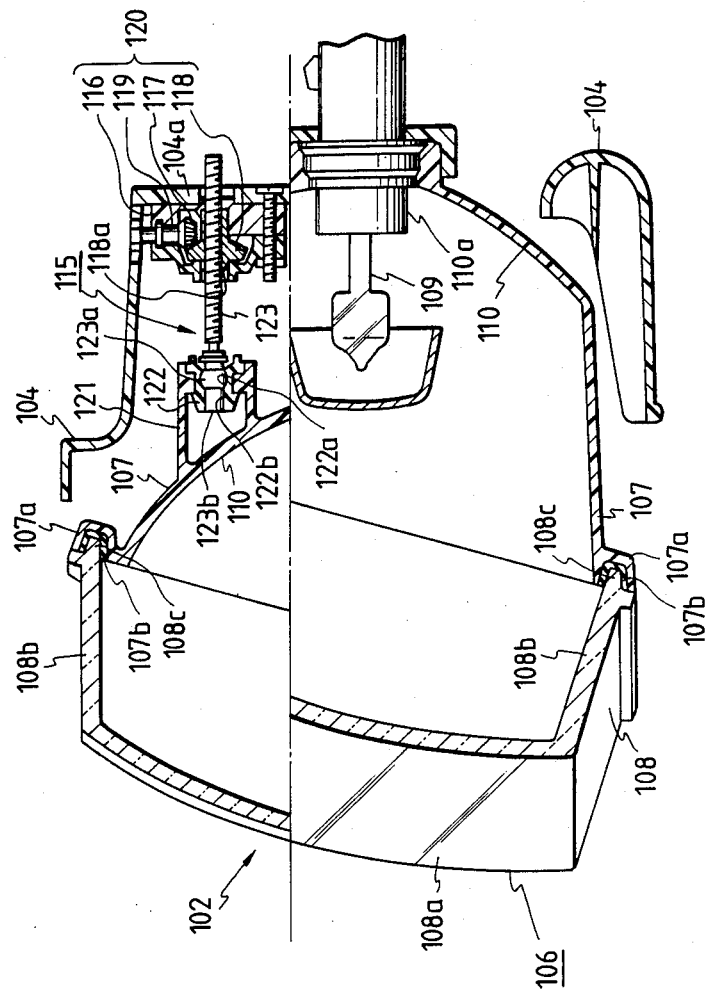
FIG. 14 is a sectional view taken along a line XIV—XIV in FIG. 12.

In FIGS. 11 and 12, points A, B and C are the points where the headlamp unit 106 is supported by the lamp housing 104, as viewed from the front. More specifically, the point A is a turn fulcrum section, and the point B located laterally of the point A and the point C located below the point A are adjustment points for adjustment of the gap between the headlamp unit 106 and the lamp housing 104.

Further, reference numeral 111 designates a turn fulcrum mechanism forming the turn fulcrum section. The turn fulcrum mechanism 111 includes a pin receiving part 112 extended forward from the rear wall 104a of the lamp housing 4, and a supporting pin 114 secured to a supported part 113 which protrudes rearward from the rear surface of the lamp body 107. The lower end portion 114a of the supporting pin 114 is substantially spherical, and it is rotatably inserted into a spherical recess 112a formed in the upper surface of the pin receiving part 112. That is, the headlamp unit 106 is supported by the lamp housing 104 in such a manner that it is tiltable about the point where the supporting pin 114 is supported by the pin receiving part 113 (the point being the above-described point A).

Reference numeral 115 designates a horizontal aiming adjustment mechanism forming the adjustment point B. The horizontal aiming adjustment mechanism 15 includes, in a case 116 secured to the rear wall 104a of the lamp housing 104, two bevel gears 117 and 118 engaged with each other, and a vertically extending operating rod 119 secured to the bevel gear 117, a receiving part 122 coupled to the rear end portion of a supported part 121 which protrude rearward from the rear surface of the lamp body 107, and an aiming adjustment shaft 123 whose larger part is threaded. The middle portion of the aiming adjustment shaft 123 is engaged with a threaded hole 118a formed at the center of the bevel gear 118. The aiming adjustment shaft 123 has a spherical part 123a at the front end. The spherical part 123a of the shaft 123 is rotatably fitted in a spherical recess 122a which is formed in the receiving part 122 in such a manner that it opens rearward. A plate-shaped part 123b extending from the front end of the s spherical part 123a is loosely fitted in an engaging recess 122b formed in the front end portion of the recess 122a which is formed in the receiving part 122 in such a manner that it opens rearward A plate-shaped part 123b extended from the front end of the spherical part 123a is loosely fitted in an engaging recess 122b which is formed in the front end portion of the recess 122a of the receiving part 122 and is larger than the plate-shaped part 123, so that the aiming adjustment shaft 123 is prevented from being rotated around its axis. Accordingly, as the bevel gear 117 is turned with the operating rod 119, the mating bevel gear 118 is rotated, thus moving the aiming adjustment shaft 123 axially. As a result, the headlamp unit 106 is swung about the line passing through the points A and C, namely, an axis of rotation. Thus, the direction of irradiation is adjusted in the horizontal plane.

Further, reference numeral 124 designates a vertical aiming adjustment mechanism forming the adjustment point as the point C. The vertical aiming adjustment mechanism 124 is fundamentally similar in structure to the above-described horizontal aiming adjustment mechanism 115. Therefore, the components of the vertical aiming adjustment mechanism 124 are designated by the same reference numerals of those of the horizontal aiming adjustment mechanism 115 but suffixed with a prime mark (').

In the vertical aiming adjustment mechanism 124, the operating rod 119' is longer than that 119 in the horizontal aiming adjustment mechanism 115, and it forms a small angle with the vertical direction so that its upper end portion is positioned beside the turn fulcrum mechanism 111. As the bevel gear 117' is rotated with the operating rod 119', the aiming adjustment shaft 123' is moved axially, so that the headlamp unit is turned about the line passing through the points A and B; that is, the direction of irradiation is adjusted in a vertical plane.

When the middle portion of the aiming adjustment shaft 123 in the horizontal aiming adjustment mechanism 115 is engaged with the bevel gear 128 of the gear unit 120, the headlamp unit 106 takes the position indicated by the solid lines in FIG. 11. In general, the headlamp unit 106, under this condition, is mounted on the lamp housing 104 and is &s subjected to aiming adjustment. The adjustment is made in the range of swing between the position indicated by the two-dot chain line and the position indicated by the one-dot chain line in FIG. 11.

The auxiliary headlamp 103 includes a box-shaped lamp body 125 opened forwardly, a lens 126 covering the front opening of the lamp body 125, a reflecting mirror 128 arranged in the lamp space 127 which is defined by the lamp body 125 and the lens 126, a light bulb 129 supported by the mirror 128, a turn fulcrum mechanism which supports the mirror 128 tiltably with respect to the lamp body 125, and an aiming adjustment mechanism for tilting the mirror 128.

The mirror 128 is smaller than the lamp body 125, and its rear wall 130 is in the form of a paraboloid of revolution from which a part is removed. The inner surface 130a of the rear wall 130 is a reflecting surface. The rear wall 130 has a light bulb mounting hole 131 at the center. The base metal part of the light bulb 129 is fitted in the light bulb mounting hole 131 in such a manner that the light emitting part is located at the focal point of the reflecting surface 130a.

The lens 126 is made up of a rectangular front portion 126a, and a peripheral wall portion 126b which protrudes rearward from the periphery of the front portion 126a. The right and left sides 126d and 126c of the peripheral wall portion 126b are inclined to the left.

The lamp body 125 includes a lens mounting part 125a extending sideward from its front edge. A lens mounting groove 125b is formed in the lens mounting part 125a in such a manner that it is opens forwardly. The lens 126 has a stripe 126e formed on the rear end face of the peripheral wall portion 126. The stripe 126e is fixedly fitted in the lens mounting groove 125b using, for instance, an adhesive. Thus, the lens is fixedly secured to the lamp body 125.

In FIG. 12, points D, D' and E are those at which the mirror 128 is supported by the lamp body 125 as viewed from the front. The two lower points D and D' are turn fulcrum sections, and the point E located above the right turn fulcrum section is an adjustment point which can adjust the distance between the mirror 128 and the lamp body 125.

Figure 15:
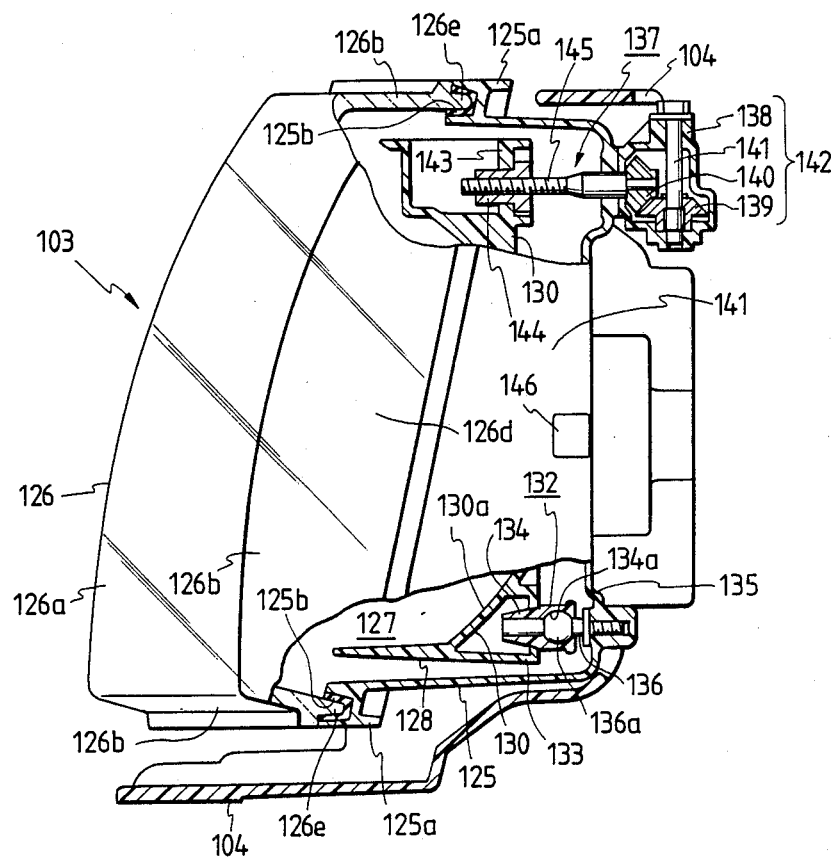
FIG. 15 is a side view, with parts cut away, showing an auxiliary headlamp.

In FIG. 15, reference numeral 132 designates a turn fulcrum mechanism forming the turn fulcrum section D. The turn fulcrum mechanism 132 includes a receiving part 134 supported by a receiving-part supporting part 133 which extends rearward from the lower end portion of the rear wall 130 of the mirror 128, and a supporting pin 136 secured to the rear wall 135 of the lamp body 125. The supporting pin 136 has a substantially spherical front end portion 136a, which is rotatably inserted in a recess 134a which is formed in the receiving part 34 in such a manner that it is opened rearward. Another turn fulcrum mechanism (not shown) forming the other turn fulcrum section D, is similar in structure to the above-described mechanism 132. Thus, the mirror 128 is supported by the lamp body 125 in such a manner that it is vertically swingable about the line passing through the two points where the receiving parts 134 of the turn fulcrum mechanisms 132 supported by the supporting pins 136.

Further in FIG. 15, reference numeral 137 designates an aiming adjustment mechanism forming the above-described adjustment point E. The aiming adjustment mechanism 137 includes, in a case 138 secured to the upper end portion of the rear wall of the lamp body 125, a gear unit 142 including two bevel gears 139 and 140 engaged with each other, and an operating rod 141 secured to the bevel gear 139 and extended vertically, a nut 144 supported in a bracket 143 which extends rearward from the rear wall 130 of the reflecting mirror 128, and an aiming adjustment shaft 145 substantially the front half of which is threaded. The rear end portion of the aiming adjustment shaft 145 is secured to the bevel gear 140 at the center, and the front end portion is threadably engaged with the nut 144. As the bevel gear 139 is rotated with the operating rod 139, the other bevel gear 140 and the aiming adjustment shaft 145 are turned as one unit so that the nut is moved relative to the aiming adjustment shaft 145. As a result, the mirror 128 is swung substantially vertically; that is, the direction of irradiation is adjusted in a vertical plane.

The auxiliary headlamp 103 is positioned on the left side of the main headlamp 102 as viewed from the front, and secured to the lamp housing 104 at a plurality of points in such a manner that, as shown in FIG. 11, the front surface of the lens 126 is substantially flush with that of the lens 108 of the main headlamp 102, and a relatively small gap is formed between the right side wall 126d of the lens 126 and the left side wall 108d of the lens 108.

In FIG. 11, reference numeral 146 designates the striking part of the auxiliary headlamp 103. The striking part 146 extends toward the main headlamp 102 from substantially the middle in height of the right side wall 147 of the lamp body 125; more specifically, it is positioned to meet the lens mounting part 107a of the lamp body 167 of the main headlamp 102 when the main headlamp 102 and the auxiliary headlamps 103 are mounted on the lamp housing 104.

The front end of the striking part 146 extends to the position where it strikes against the side of the lens mounting part 107a of the lamp body 107 of the main headlamp 102 when the headlamp unit 106 of the main headlamp 102 is turned clockwise as viewed from above until the outer surface of the left side wall 108d of the lens 108 comes close to the outer surface of the right side wall 126d of the lens 126; that is, when headlamp unit 106 is swung to the position as indicated by the two-dot chain line.

The striking part 146 thus acts as follows: For instance, when the gap between the lens 108 of the main headlamp 102 and the lens 126 of the auxiliary headlamp 103 is decreased by the horizontal aiming adjustment of the headlamp unit 106, or when the main headlamp 102 and the auxiliary headlamp 103 vibrate to approach each other during the traveling of the vehicle, the striking part 146 will contact a part (the side of the lens mounting part 107a) of the lamp body 107 of the main headlamp 102 before the lenses 106 and 108 are brought into contact with each other; that is, the lenses 106 and 108 are not directly brought into contact with each other.

As described above, the vehicle lamp device of the invention has two vehicle lamps, which are a headlamp and a vehicle lamp arranged adjacent to the headlamp, and the headlamp is designed so as to be tilted by the aiming adjustment mechanism, and the front lens of the vehicle lamp adjacent to the headlamp is arranged close to the front lens of the latter. One of the two vehicle lamps has the striking part which before the two vehicle lamps collide with each other, contacts a part of the other vehicle lamp which is other than the front lens.

Therefore, with the vehicle lamp device of the invention, even when, under the condition that the headlamp is swung to decrease the clearance between the headlamp and the vehicle lamp adjacent thereto, the two lamps are vibrated, the striking part will contact other than the lens before the lenses of the two lamps collide with each other. Therefore, the lenses will never collide with each other, and accordingly they are protected from damage, and are prevented from producing jarring sounds.

In the above-described embodiment, the striking part is integral with the lamp body, and therefore it is unnecessary to separately provide a component as the striking part. However, it goes without saying that the striking part may be provided separate from the lamp body so that it is secured thereto.

In the above-described embodiment, the striking part is provided for only one of the two vehicle lamps which are set close to each other. However, the striking part may be provided for each of them. In this case, the striking parts may be so positioned that they confront with each other.

The invention has been described with reference to the vehicle device having the main headlamp and the auxiliary headlamp disposed adjacent to the latter; however, it should be noted that the invention is not limited thereto or thereby. That is, the invention is widely applicable to vehicle lamp devices in which two lamps are arranged close to each other.

Figure 16:
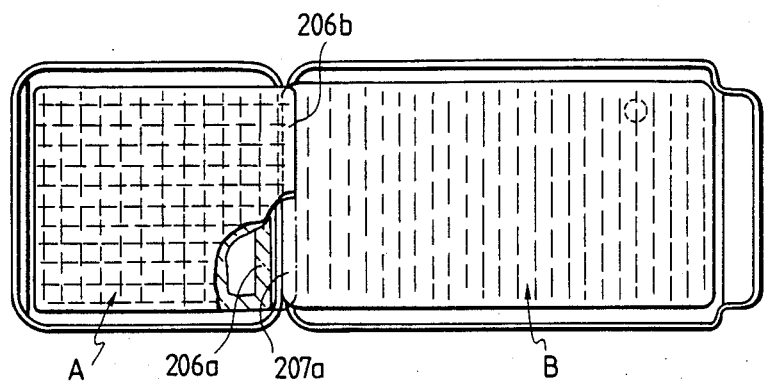
FIG. 16 is a front view, with part cut away, showing another vehicle lamp constructed according to the invention.
Figure 17:
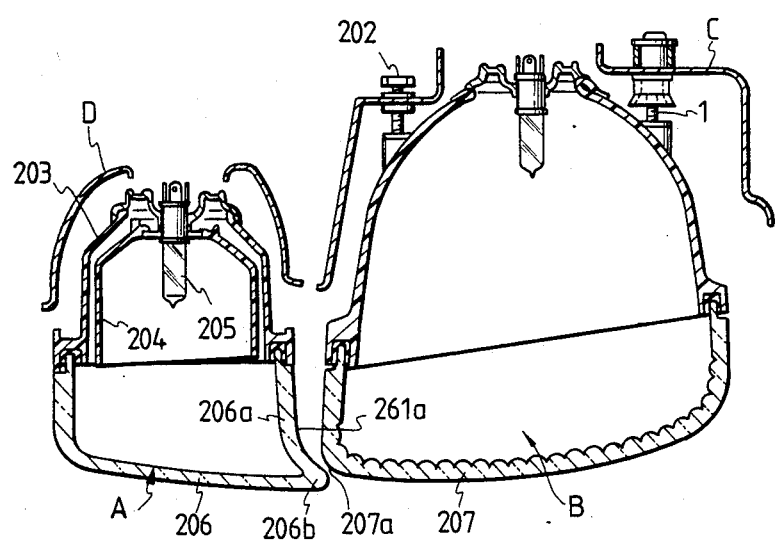
FIG. 17 is a cross-sectional view of the vehicle lamp of FIG. 16 mounted beside a headlamp.

Referring to FIGS. 16 and 17, another example of a vehicle lamp according to the invention will be described.

In these figures, reference character A designates a vehicle lamp which is to be installed beside a unit movable head lamp B. More specifically, the vehicle lamp is a fog lamp.

As is well known in the art, the head lamp is mounted on a housing C with one fulcrum member 201 and two aiming screws 202 in such a manner that it can be aimed as desired. The vehicle lamp A according to the invention is provided beside the headlamp thus mounted. The vehicle lamp A, similarly as in a conventional vehicle lamp, includes a lamp body 203, a mirror 204, a light bulb 205, and a front lens 206. The vehicle lamp is mounted on the housing or vehicle body D in such a manner that it is positioned beside the headlamp B. In this connection, the side 261a of the front lens 26 which is located adjacent the headlamp B is curved inwardly so that it cannot obstruct the aiming operation of the head lamp B. More specifically, the outer surface 261a of the side wall 206a of the front lens 206 is curved inwardly so that, when the front lens 206 of the vehicle lamp A and the front lens 207 of the headlamp B are positioned adjacent to each other, it substantially follows the aiming locus of the edge 207a of the front lens 207 of the headlamp B which is moved as the latter is aimed; that is, as the headlamp B is aimed, the edge 207a of the front lens 207 of the headlamp B is moved along the inwardly curved outer surface 261a of the front lens 206. The vehicle lamp A is positioned beside the headlamp B in such a manner that, when the headlamp B is viewed from the front, the edge 206b of the front lens 206 of the vehicle lamp A overlaps the edge 207a of the front lens 207 of the headlamp B.

In the vehicle lamp of the invention designed as described above, when it is installed beside the headlamp in such a manner that it is close to the latter, the edge of the front lens of the headlamp is movable along the inwardly curved outer surface of the side wall of the front lens of the vehicle lamp while the headlamp is being aimed; that is, the vehicle lamp will never obstruct the aiming operation of the headlamp. In addition, when the headlamp is viewed from the front, no gap is observed between the vehicle lamp and the headlamp, with the result that the vehicle lamp and the headlamp are more harmonious with each other.

What is claimed is:

1. A vehicle lamp device comprising: a unit movable rectangular headlamp, and a rectangular vehicle lamp arranged adjacent said unit movable rectangular headlamp with a gap therebetween, each of said lamps having a front lens, at least one of said front lenses having a sidewall which confronts a sidewall of the other of said lamps and which has at least one front edge protruding outwardly toward the other of said front lenses so that the gap between the front lenses of said lamps is narrowed at said at least one front edge.

2. The vehicle lamp device of claim 1, wherein extension lines of respective side surfaces of said headlamp and said vehicle lamp intersect at a point forward of said headlamp and said vehicle lamp.

3. A vehicle lamp device comprising: a unit movable rectangular headlamp arranged adjacent a bumper, said unit movable rectangular headlamp having a front lens having a lower wall which confronts an upper edge of said bumper with a gap therebetween, said lower wall having a front edge protruding outward toward said bumper so that the gap between said front lens and said bumper is decreased at said front edge.

4. A vehicle lamp device comprising: a headlamp, a vehicle lamp adjacent said headlamp, an aiming adjustment mechanism for tilting said headlamp, said vehicle lamp having a front lens adjacent said headlamp arranged adjacent to a front lens of said headlamp, and a striking part provided on one of said headlamp and said vehicle lamp, said striking part, when said headlamp is tilted, contacting a part of one of said headlamp and said vehicle lamp other than said front lens of said headlamp before said front lenses of said two vehicle lamps collide with each other, said striking part being provided other than on said front lens of said other vehicle lamp.

5. In a vehicle lamp positioned adjacent a unit movable headlamp, the improvement wherein an outer surface of one side wall of a front lens of said vehicle lamp, which surface is adjacent an edge of a lens of said headlamp, is inwardly curved along a line parallel to an aiming locus of said edge.

* * * * *